US006826458B2

(12) United States Patent
Horvath et al.

(10) Patent No.: US 6,826,458 B2
(45) Date of Patent: Nov. 30, 2004

(54) GRAPHIC CLOSURE INDICATOR FOR COCKPIT TRAFFIC DISPLAY

(75) Inventors: Steve Horvath, Salem, OR (US); Robert Grove, Newberg, OR (US); Craig Bowers, San Jose, CA (US)

(73) Assignee: Garmin AT, Inc., Salem, OR (US)

( * ) Notice: Subject to any disclaimer, the term of this patent is extended or adjusted under 35 U.S.C. 154(b) by 90 days.

(21) Appl. No.: 10/029,094

(22) Filed: Oct. 25, 2001

(65) Prior Publication Data

US 2002/0128755 A1 Sep. 12, 2002

Related U.S. Application Data

(60) Provisional application No. 60/243,239, filed on Oct. 25, 2000.

(51) Int. Cl.[7] .......................... B64C 11/34; G01C 23/00
(52) U.S. Cl. .................. 701/3; 701/4; 701/5; 701/9; 244/1 R; 342/27; 342/29; 342/36; 340/945; 340/963; 340/979
(58) Field of Search ........................... 701/3, 4, 5, 9, 701/15, 16, 36; 244/1 R; 342/27, 29, 36; 340/945, 963, 979

(56) References Cited

U.S. PATENT DOCUMENTS

| | | |
|---|---|---|
| 4,197,538 A | 4/1980 | Stocker |
| 4,639,730 A | 1/1987 | Paterson et al. |
| 4,646,244 A | 2/1987 | Bateman et al. |
| 4,853,700 A | 8/1989 | Funatsu et al. |
| 4,896,154 A | 1/1990 | Factor et al. |
| 4,914,733 A | 4/1990 | Gralnick |
| 4,980,683 A | 12/1990 | O'Sullivan et al. |
| 5,111,400 A | 5/1992 | Yoder |
| 5,153,836 A | 10/1992 | Fraughton et al. |
| 5,179,377 A | 1/1993 | Hancock |
| 5,185,606 A | 2/1993 | Verbaarschot et al. |

(List continued on next page.)

FOREIGN PATENT DOCUMENTS

WO    WO 00/50920    8/2000

OTHER PUBLICATIONS

2002/0075171—Kuntman et al—system and method for predicting and displaying wake vortex turbulance, Jun. 20, 2002.*
Sandra G. Hart and Les L. Loomis, Evaluation of the Potential Format and Content of a Cockpit Display of Traffic Information; *Human Factors*, Oct., 1980, pp. 591–604, 22(5), The Human Factors Society, Inc.
Terence S. Abbott, Gene C. Moen, Lee H. Person, Jr., Gerald L. Keyser, Jr., Kenneth R. Yenni, and John F. Garren, Jr., Flight Investigation of Cockpit–Displayed Traffic Information Utilizing Coded Symbology in an Advanced Operational Environment, Jul., 1980, pp. 1–28, NTIS, Springfield, VA.

(List continued on next page.)

*Primary Examiner*—Thomas G. Black
*Assistant Examiner*—Olga Hernandez
(74) *Attorney, Agent, or Firm*—Devon A. Rolf

(57) ABSTRACT

A system for graphically displaying on a cockpit display an indication of closure (i.e. a "closure indictor") with a selected target aircraft. In a preferred embodiment of the invention, the system only displays a closure indicator if: (1) the selected target aircraft is within a predetermined monitoring zone; and (2) the track of the selected target aircraft is within a pre-determined variation angle of the track of the Own Ship aircraft. If the rate of closure between the selected target aircraft and the Own Ship aircraft is within a predetermined range of values, the closure indicator includes a closing/receding indicia (such as an upwardly or downwardly directed arrow) that indicates whether the Own Ship aircraft is closing in on or receding from the selected target aircraft. The system preferably removes the closure indicator from display when the Own Ship aircraft or the selected target aircraft ceases to be airborne.

49 Claims, 10 Drawing Sheets

U.S. PATENT DOCUMENTS

| | | |
|---|---|---|
| 5,200,902 A | 4/1993 | Pilley |
| 5,202,690 A | 4/1993 | Frederick |
| 5,227,786 A | 7/1993 | Hancock |
| 5,313,396 A * | 5/1994 | Terpstra et al. ............. 701/200 |
| 5,420,968 A | 5/1995 | Johri |
| 5,442,556 A | 8/1995 | Boyes et al. |
| 5,450,329 A | 9/1995 | Tanner |
| 5,493,309 A | 2/1996 | Bjornholt |
| 5,519,392 A | 5/1996 | Oder et al. |
| 5,548,515 A | 8/1996 | Pilley et al. |
| 5,566,074 A | 10/1996 | Hammer |
| 5,574,648 A | 11/1996 | Pilley |
| 5,596,332 A | 1/1997 | Coles et al. |
| 5,636,123 A | 6/1997 | Rich et al. |
| 5,638,282 A | 6/1997 | Chazelle et al. |
| 5,677,841 A | 10/1997 | Shiomi et al. |
| 5,781,146 A | 7/1998 | Frederick |
| 5,838,262 A | 11/1998 | Kershner et al. |
| 5,839,080 A | 11/1998 | Muller et al. |
| 5,867,804 A | 2/1999 | Pilley et al. |
| 5,883,586 A | 3/1999 | Tran et al. |
| 5,884,223 A | 3/1999 | Tognazzini |
| 5,892,462 A | 4/1999 | Tran |
| 5,920,276 A | 7/1999 | Frederick |
| 5,936,552 A | 8/1999 | Wichgers et al. |
| 5,945,926 A | 8/1999 | Ammar et al. |
| 6,021,374 A | 2/2000 | Wood |
| 6,154,151 A | 11/2000 | McElreath et al. |
| 6,314,366 B1 * | 11/2001 | Farmakis et al. ........... 701/201 |

OTHER PUBLICATIONS

W.H. Harman, TCAS: A System for Preventing Midair Collisions, *The Lincoln Laboratory Journal,* 1989, pp. 437–458, vol. 2, No. 3, United States of America.

Paul R. Drouilhet, Jr., Air Traffic Control Development at Lincoln Laboratory, *The Lincoln Laboratory Journal,* 1989, pp. 331–344, vol. 2, No. 3, United States of America.

J.L. Gertz, Multisensor Surveillance for Improved Aircraft Tracking, *The Lincoln Laboratory Journal,* 1989, pp. 381–396, vol. 2, No. 3, United States of America.

* cited by examiner

GRAPHIC CLOSURE INDICATOR FOR COCKPIT TRAFFIC DISPLAY

CROSS REFERENCE TO RELATED APPLICATION

This application claims the benefit of U.S. Provisional Application Ser. No. 60/243,239, filed Oct. 25, 2000.

TECHNICAL FIELD

This invention relates to displays of traffic in the cockpit of an aircraft and, more particularly, relates to displaying an indication of closure between an Own Ship aircraft and a selected target aircraft in response to the flight characteristics of the selected target aircraft satisfying certain specified criteria.

BACKGROUND OF THE INVENTION

A primary task for pilots is to be aware of nearby air traffic by maintaining a constant visual scan. If traffic is sighted, the pilot must first assess the threat posed by the intruder aircraft, then, if necessary, maneuver to avoid the aircraft. This strategy is termed "see-and-avoid." The effectiveness of see-and-avoid depends on the ability of a pilot to visually acquire an intruder aircraft early enough in the encounter to enable threat assessment and avoidance. A Cockpit Display of Traffic Information (CDTI) assists the pilot with see-and-avoid by providing a display of nearby traffic.

A CDTI display typically displays nearby target aircraft and information about the target aircraft, such as altitude, track, and identification information. This information may be received from one or more sources, including Traffic Information Service (TIS) from a ground-based air traffic control center, and Automatic Dependent Surveillance-Broadcast (ADS-B) from transponders on other aircraft, or vehicles The ability to easily determine from the display the movement of nearby aircraft relative to the aircraft containing the display is especially desirable for effective threat assessment and avoidance. Additionally, aircraft operations can benefit from the timely and effective presentation of traffic information that can assist in decision making for the flight crew. Thus, there is a need for enhancements to CDTI units to provide easily-readable graphic indications of the relative movement and status of nearby aircraft.

SUMMARY OF THE INVENTION

The present invention is an improvement in displaying traffic information on an aircraft display, such as a CDTI. More specifically, the invention provides a method and system for graphically displaying on a cockpit display a graphical indication of the rate at which an Own Ship aircraft is closing in on, or receding from, a selected target aircraft. This rate, which is generally referred to as a "closure rate", has a positive value if the Own Ship aircraft is closing in on the selected target aircraft, and a negative value if the Own Ship aircraft is receding from the selected target aircraft. The graphical indication of the rate at which the Own Ship aircraft is closing in on, or receding from, the selected target aircraft is generally referred to as a "closure indicator."

In a preferred embodiment of the invention, the system displays a closure indicator in response, at least in part, to both of the following requirements being satisfied: (1) the selected target aircraft is within a pre-determined monitoring zone; and (2) the track of the selected target aircraft is within a pre-determined variation angle of the track of the Own Ship aircraft. In an alternative embodiment of the invention, the system also displays the closure indicator, at least in part, in response to (3) the rate of closure between the selected target aircraft and the Own Ship aircraft being within a predetermined range of values. In a preferred embodiment of the invention, the system is configured to display no closure indicator, at least partially in response to the system failing to meet one or more of the above requirements.

As noted above, a system according to a preferred embodiment of the invention only displays a closure indicator if the first two of the above requirements are satisfied. However, in various alternative embodiments of the invention, the system is configured to display a closure indicator only if a different pre-determined two of the above requirements are satisfied. For example, in one embodiment of the invention, the system only displays a closure indicator if requirements 1 and 3, above, are satisfied. Such a system only displays a closure indicator if: (1) the selected target aircraft is within a pre-determined monitoring zone; and (2) the rate of closure between the selected target aircraft and the Own Ship aircraft is within a predetermined range of values. In another embodiment of the invention, the system only displays a closure indicator if requirements 2 and 3, above, are satisfied. Such a system only displays a closure indicator if: (1) the track of the selected target aircraft is within a predetermined variation angle of the track of the Own Ship aircraft, and (2) the rate of closure between the selected target aircraft and the Own Ship aircraft is within a predetermined range of values.

In another alternative embodiment of the invention, the system only displays a closure indicator if each of requirements 1–3 is satisfied. Such a system only displays a closure indicator if: (1) the selected target aircraft is within a pre-determined monitoring zone; (2) the track of the selected target aircraft is within a pre-determined variation angle of the track of the Own Ship aircraft; and (3) the rate of closure between the selected target aircraft and the Own Ship aircraft is within a predetermined range of values.

In a further alternative embodiment of the invention, the system displays a closure indicator if a predetermined one of the above requirements is satisfied. In an additional alternative embodiment of the invention, the system constantly displays a closure indicator on the display screen while the aircraft is in flight.

The system is preferably configured to remove a closure indicator from display on the display screen in response to either the Own Ship aircraft landing or the selected target aircraft landing.

In a preferred embodiment of the invention, the pre-determined monitoring zone referenced above is positioned adjacent to a front portion of the Own Ship aircraft. This pre-determined monitoring zone is preferably a substantially cone-shaped segment of airspace. Additionally, the cone-shaped segment of airspace is preferably positioned so that the apex of the cone-shaped segment of airspace is adjacent a front portion of the Own Ship aircraft. Furthermore, the cone-shaped segment of airspace is preferably oriented so that the axis of the cone-shaped segment of airspace is substantially co-linear with the track of the Own Ship aircraft. In one embodiment of the invention, the apex of the cone-shaped segment of airspace is immediately adjacent a front portion of the Own Ship aircraft and the axis of the cone-shaped segment of airspace is oriented in substantially the same direction as the track of the Own Ship aircraft. The vertex angle of the cone-shaped segment of airspace is preferably about 40 degrees. In a preferred embodiment of the invention, the system is configured for allowing a user to at least partially modify at least one boundary of the monitoring zone.

Turning now to the requirement that the track of the selected target aircraft be within a predetermined variation angle of the Own Ship aircraft's track, the predetermined variation angle is preferably about 20 degrees. In a preferred embodiment of the invention, the system is configured to allow a pilot or other user to modify the predetermined variation angle to account for current flying conditions.

The closure indicator displayed by the system preferably comprises an alphanumeric value indicating the current rate at which the Own Ship aircraft is closing in on, or receding from, the selected target aircraft. The closure indicator also preferably includes a plus or minus sign immediately adjacent to the alphanumeric value to indicate whether the Own Ship aircraft is closing in on, or receding from, the selected target aircraft. The closure indicator preferably includes a plus sign if the Own Ship aircraft is closing in on the selected target aircraft. Similarly, the closure indicator preferably includes a minus sign if the Own Ship aircraft is receding from the selected target aircraft.

In a preferred embodiment of the invention, if the rate of closure between the selected target aircraft and the Own Ship aircraft is within a predetermined range of values, the closure indicator also comprises a closing/receding indicia that further indicates whether the Own Ship aircraft is closing in on, or receding from, the selected target aircraft. In a preferred embodiment of the invention, the closing/receding indicia comprises an upwardly-directed arrow if the Own Ship aircraft is closing in on the selected target aircraft, and a downwardly-directed arrow if the Own Ship aircraft is receding from the selected target aircraft.

More particularly, the system is preferably configured to display, at least in part in response to the closure rate being above a predetermined upper threshold value, a closure indicator that includes a closing/receding indicia that indicates that the Own Ship aircraft is closing in on the selected target aircraft. Similarly, the system is also preferably configured to display, at least in part in response to the closure rate being below a predetermined lower threshold value, a closure indicator that includes a closing/receding indicia that indicates that the Own Ship aircraft is receding from the selected target aircraft. Furthermore, in this embodiment of the invention, the system is configured to display a closure indicator that includes no closing/receding indicia if the closure rate is both: (1) equal to or above the predetermined lower threshold value; and (2) equal to or below the predetermined upper threshold value.

In a preferred embodiment of the invention, if the closure rate is above a predetermined upper threshold value, the system displays the closure indicator above a symbol representing the Own Ship aircraft. Similarly, if the closure rate is below a predetermined lower threshold value, the system displays the closure indicator below a symbol representing the Own Ship aircraft. In this embodiment of the invention, the system is configured to display the closure indicator to one side of a symbol representing the Own Ship aircraft if the closure rate is both: (1) equal to or above the predetermined lower threshold value; and (2) equal to or below the predetermined upper threshold value.

In a preferred embodiment of the invention, the predetermined upper threshold value is about 5 knots and the predetermined lower threshold value is about −5 knots. The system is preferably configured to allow a user to modify either the predetermined upper threshold value, the predetermined lower threshold value, or both the predetermined upper threshold value and the predetermined lower threshold value to accommodate current flying conditions.

In an alternative embodiment of the invention, the system is configured to only display a rate of closure on the display screen if the rate of closure between the selected target aircraft and the Own Ship aircraft is within a predetermined range of values. In this embodiment of the invention, the system is configured to display a closure indicator in response, at least in part, to the closure rate being above a predetermined upper threshold value. Furthermore, the system is also preferably configured to display a closure indicator in response, at least in part, to the closure rate being below a predetermined lower threshold value. In this embodiment of the invention, the system is further configured to display no closure indicator on the system's display screen if the closure rate is both: (1) equal to or above the predetermined lower threshold value; and (2) equal to or below the predetermined upper threshold value.

BRIEF DESCRIPTION OF THE DRAWINGS

Figure 1:
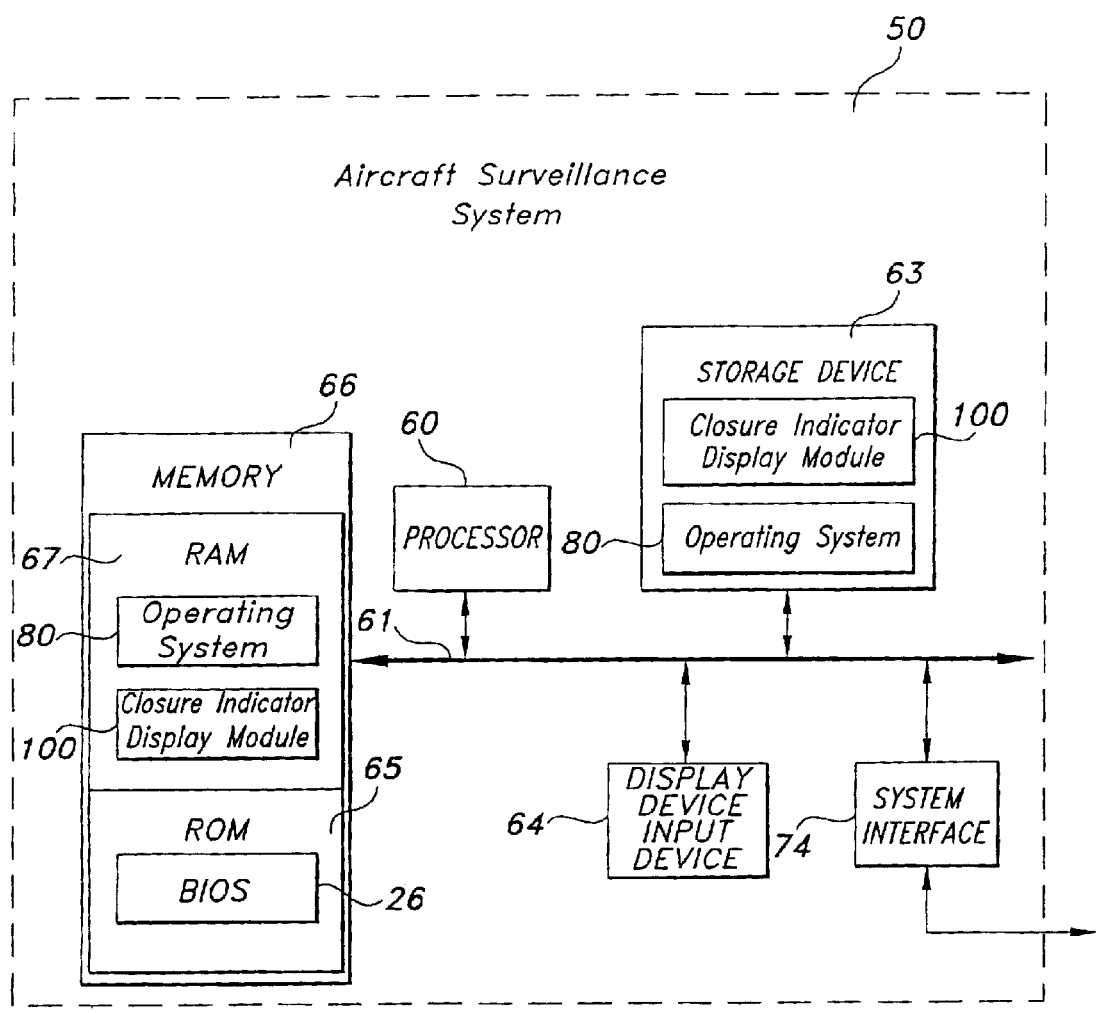

Having thus described the invention in general terms, reference will now be made to the accompanying drawings, which are not necessarily drawn to scale, and wherein:

FIG. 1 is a block diagram of an aircraft surveillance system according to a preferred embodiment of the invention.

Figure 2:
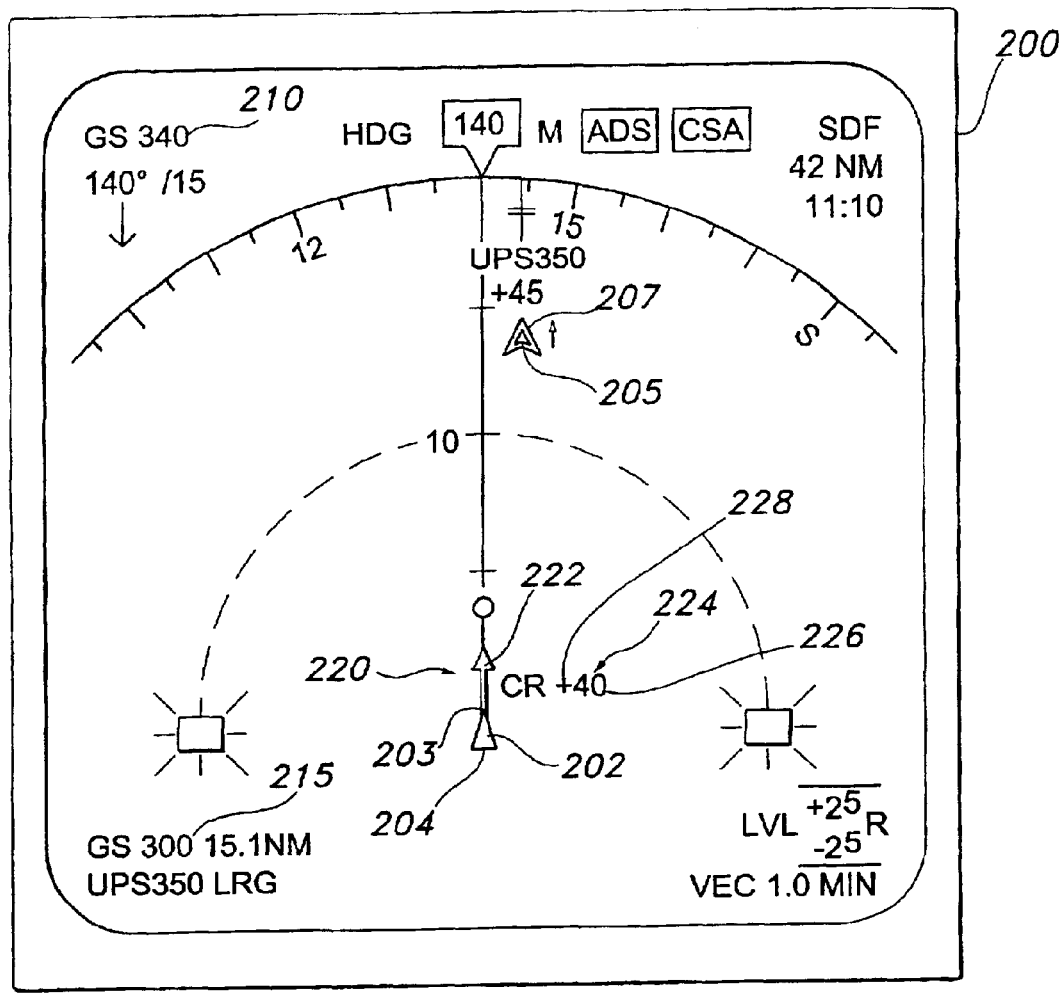

FIG. 2 is a pictorial view of a CDTI display showing a closure indicator that is displayed by an aircraft surveillance system according to a preferred embodiment of the invention when the Own Ship aircraft is closing in on a selected target aircraft at a rate of 40 knots.

Figure 3:
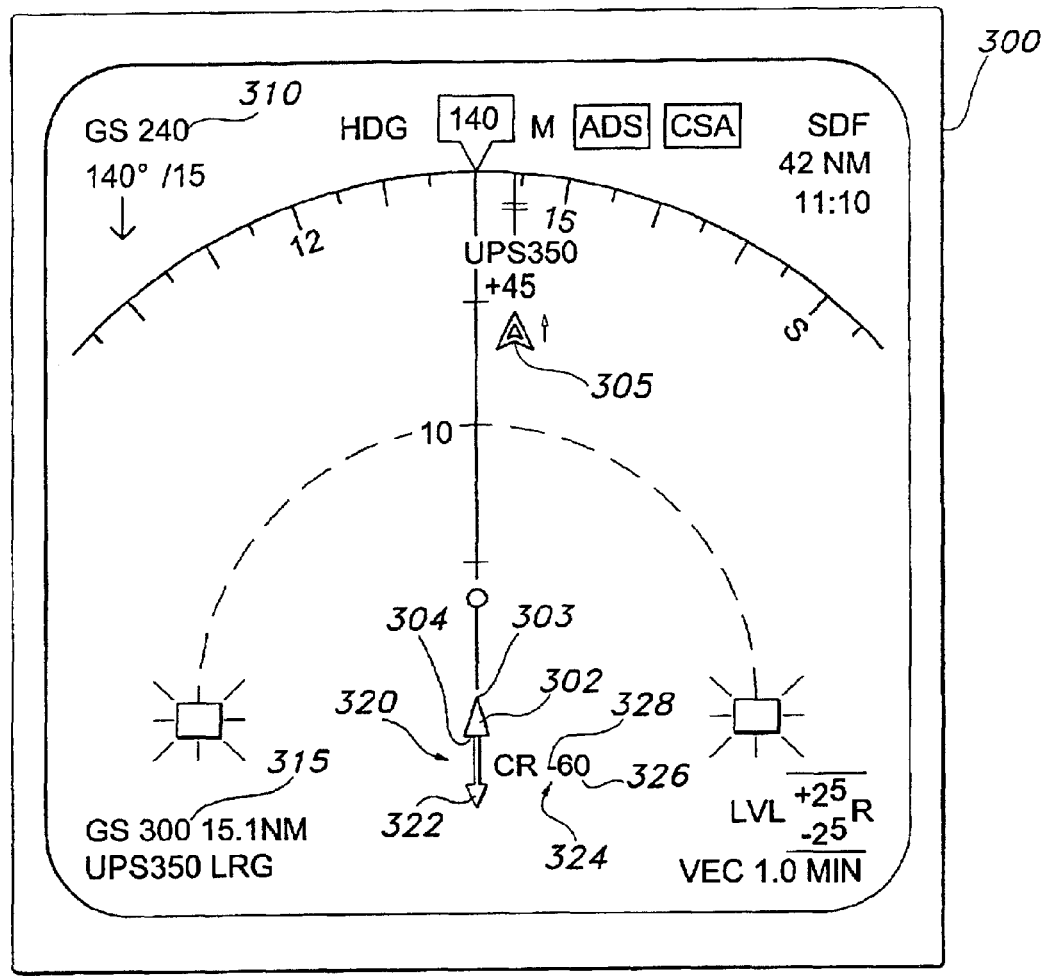

FIG. 3 is a pictorial view of a CDTI display showing a closure indicator that is displayed by an aircraft surveillance system according to a preferred embodiment of the invention when the Own Ship aircraft is receding from a selected target aircraft at a rate of 60 knots.

Figure 4:
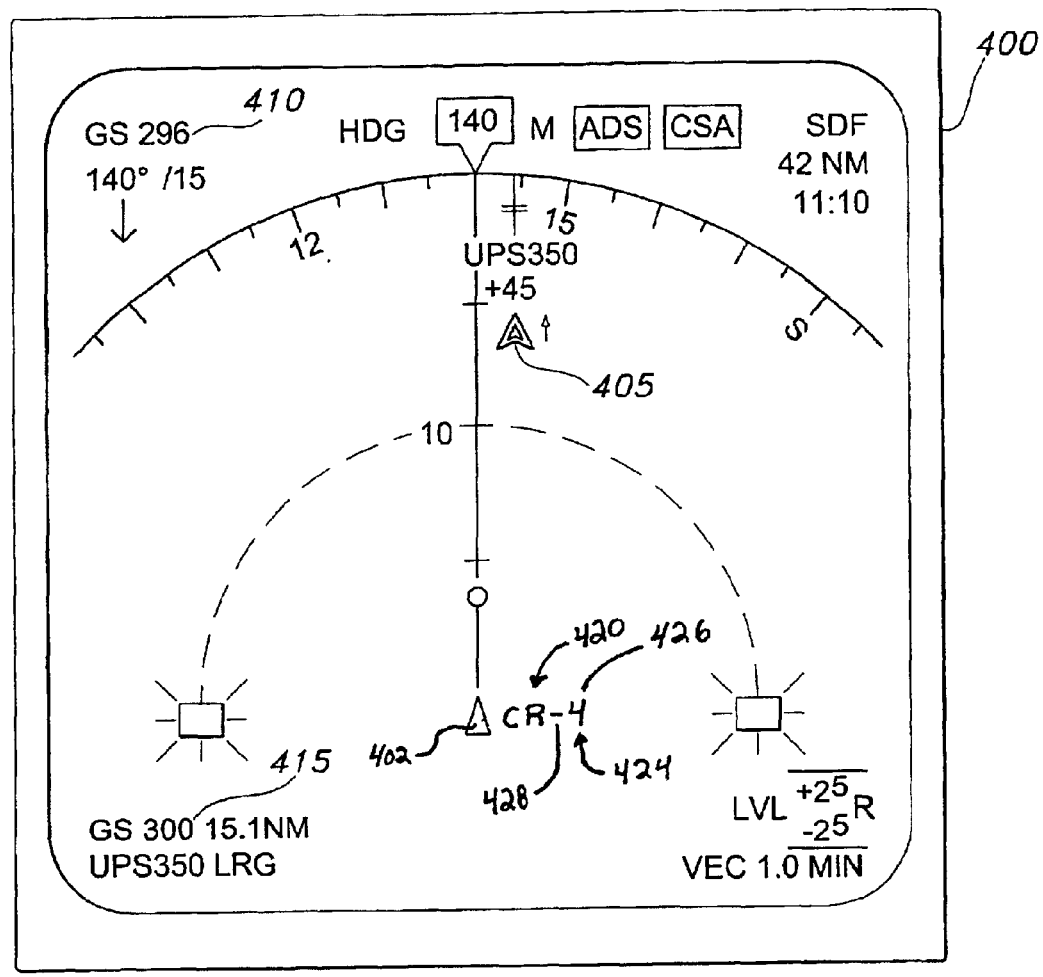

FIG. 4 is a pictorial view of a CDTI display showing a closure indicator that is displayed by an aircraft surveillance system according to a preferred embodiment of the invention when the Own Ship aircraft is receding from a selected target aircraft at a rate of 4 knots.

Figure 5:
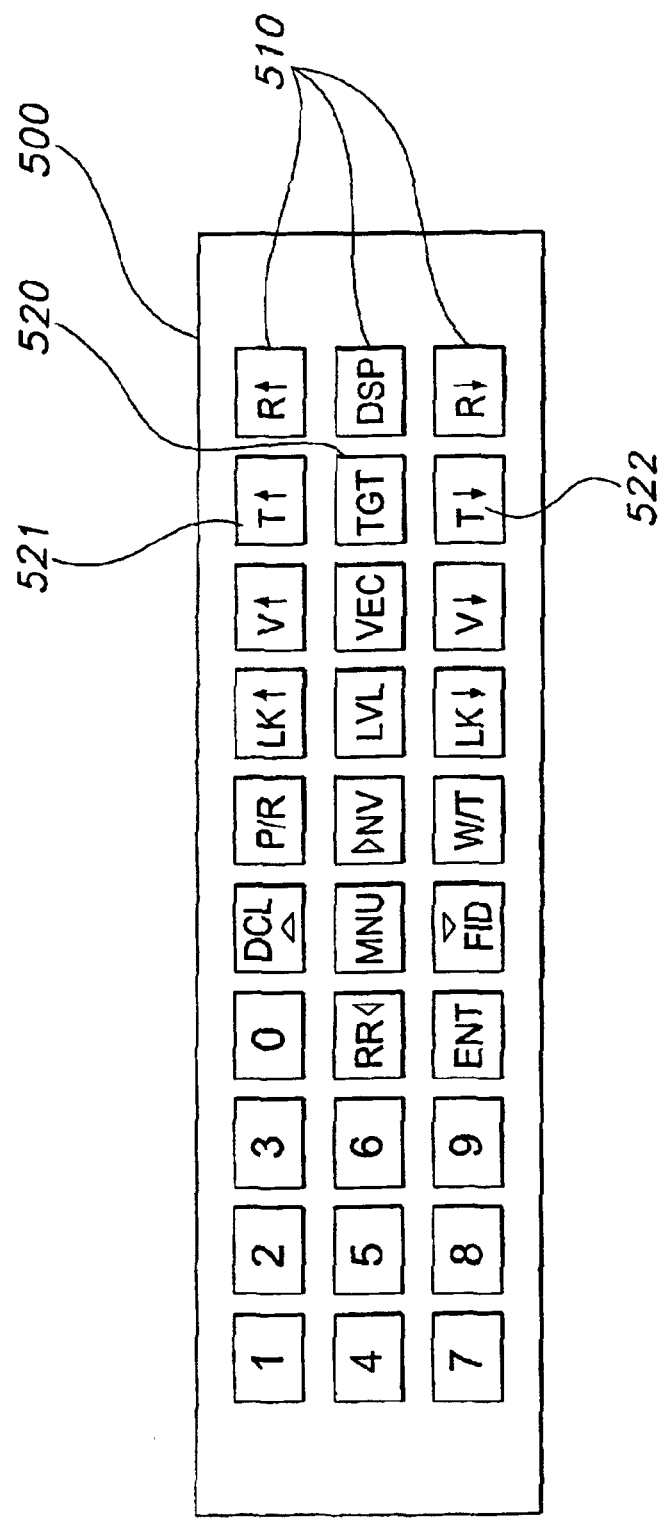

FIG. 5 is a pictorial view of a keypad used in an aircraft surveillance system according to a preferred embodiment of the invention.

Figure 6:
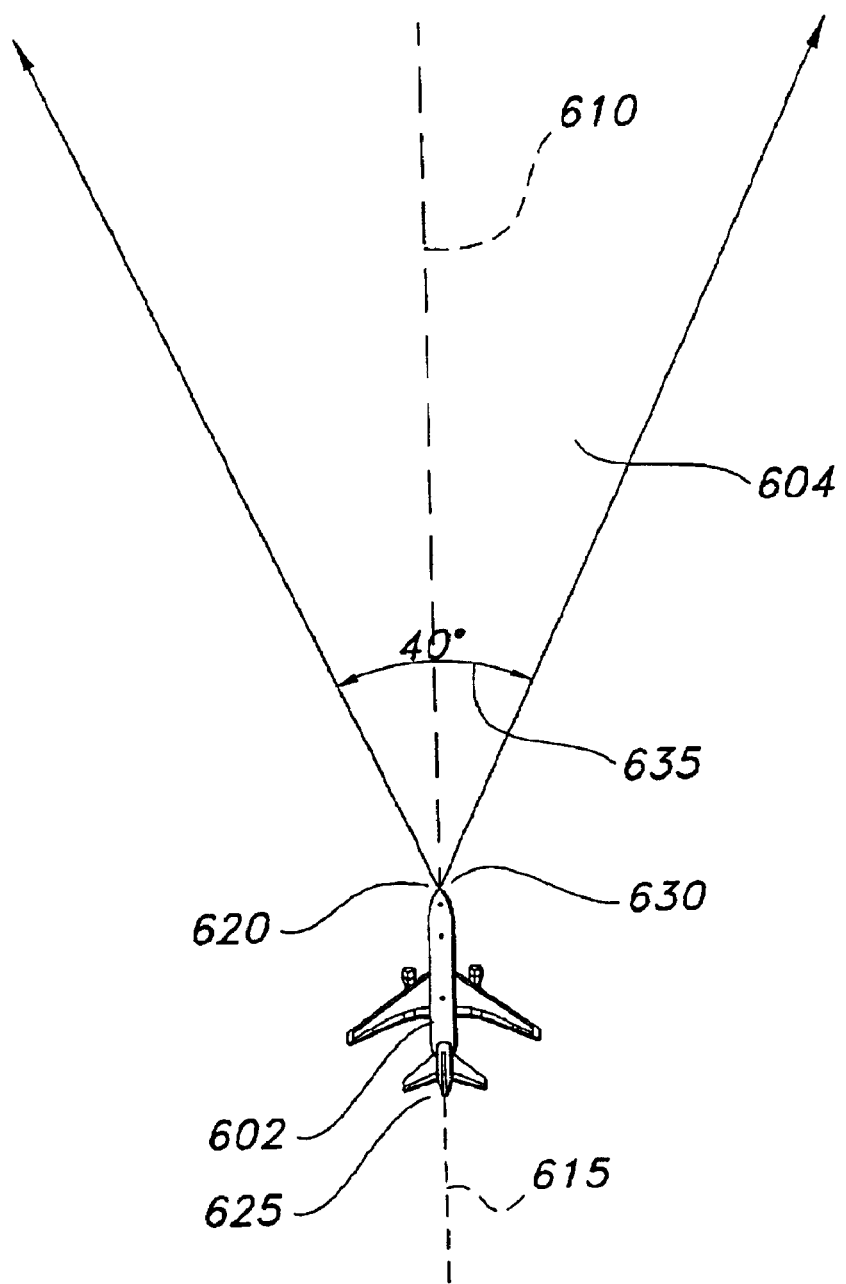

FIG. 6 is a graphically depicted top view of a monitoring zone according to a preferred embodiment of the invention in an example in which there is no wind so that the heading and track of the Own Ship aircraft are the same.

Figure 7:
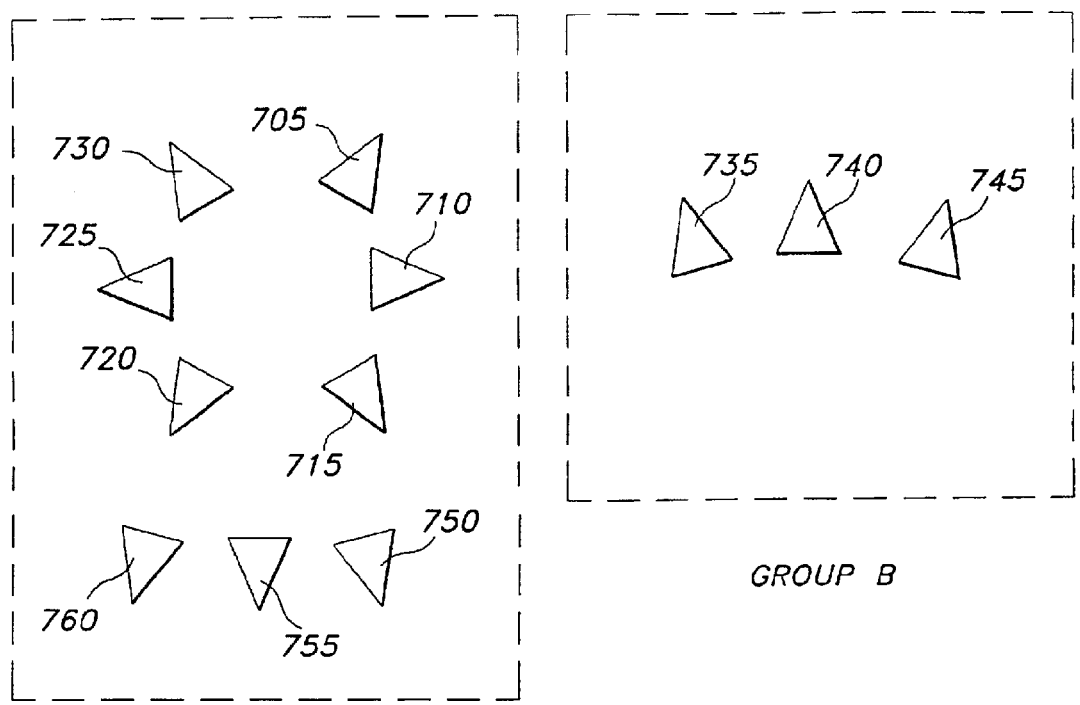
Figure 7:
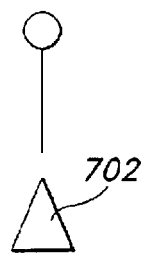

FIG. 7 is a graphical depiction of an example in which a system according to a preferred embodiment of the invention only displays a closure indicator on the CDTI display screen if the selected target aircraft's track is within a variation of 20 degrees of the Own Ship aircraft's track.

Figure 8A:
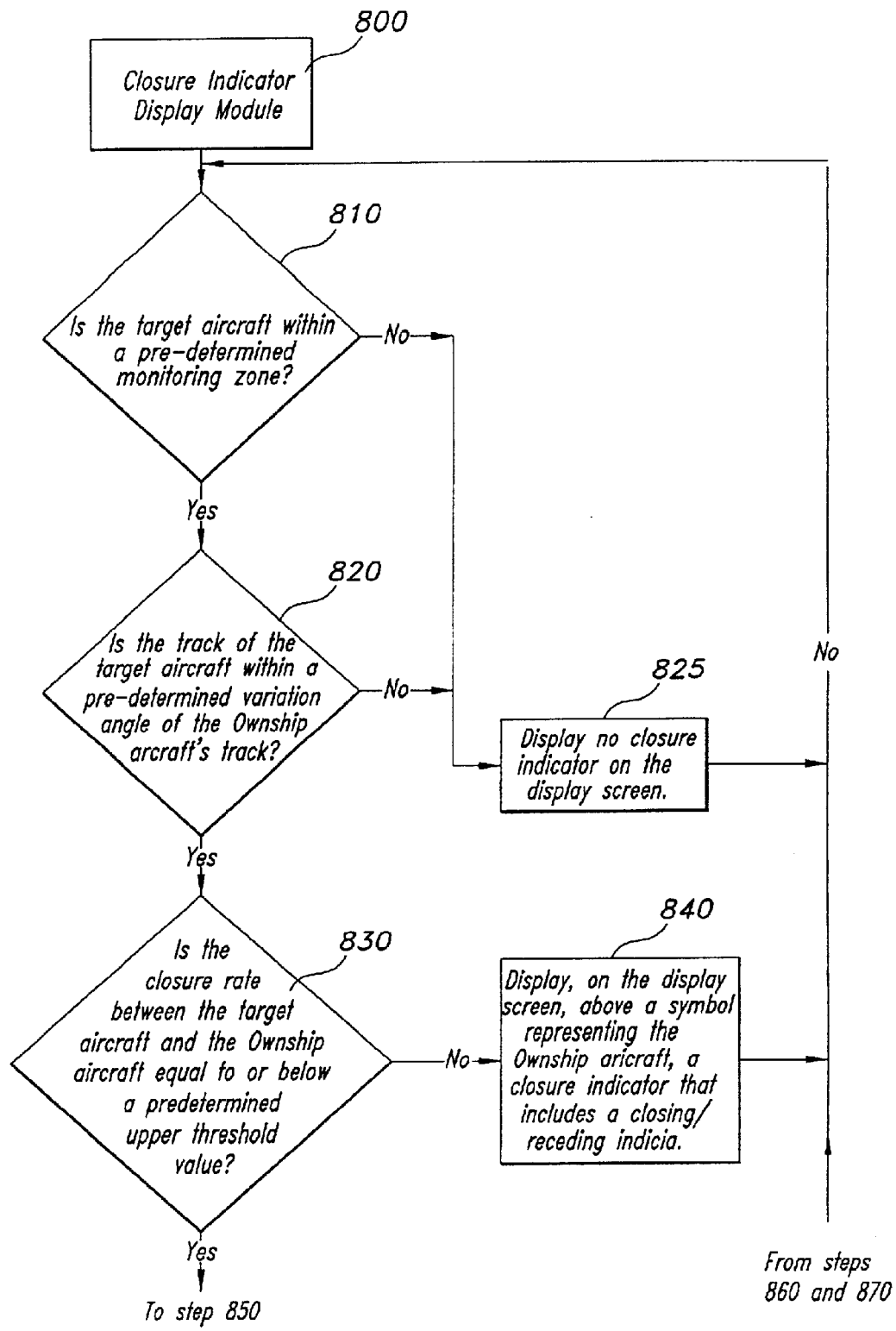
Figure 3B:
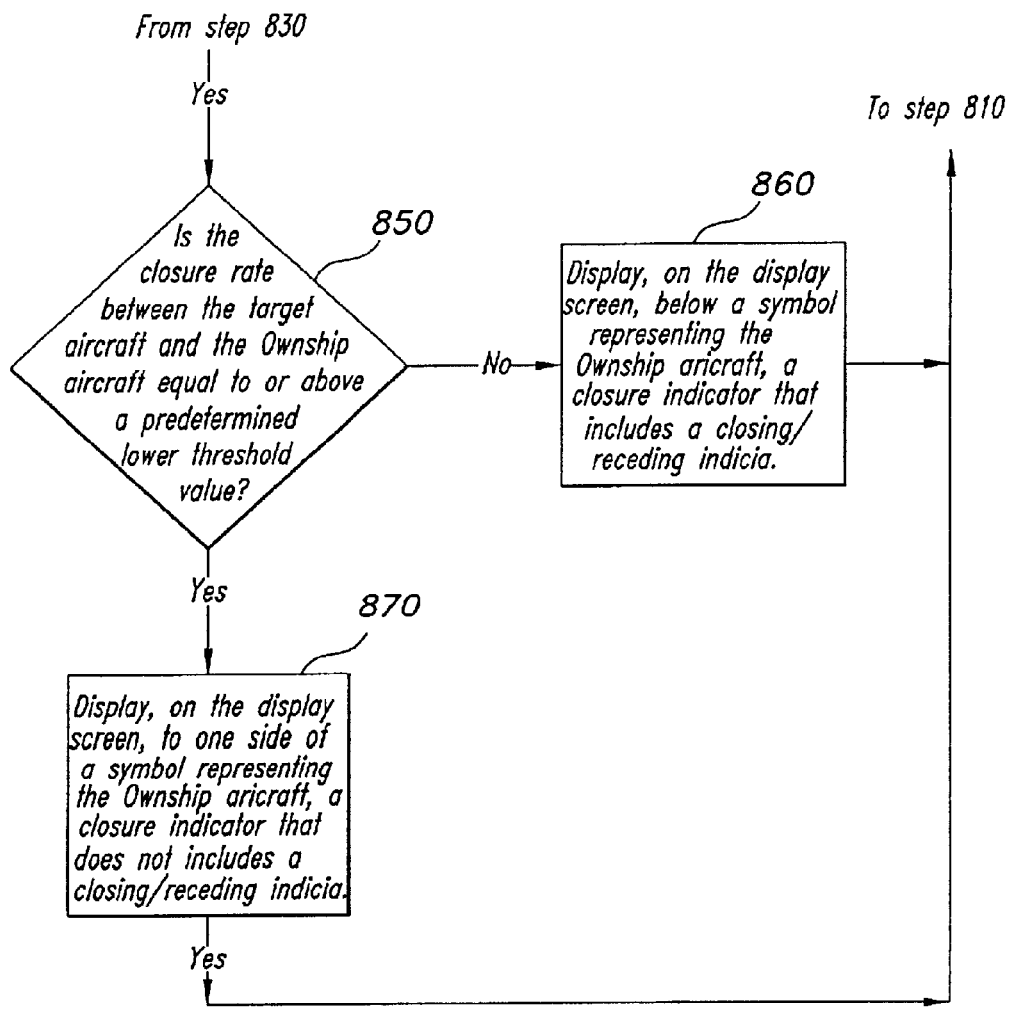

FIGS. 8A and 8B depict a flowchart that generally describes the logical operation of a closure indicator display module according to the current invention.

Figure 9:
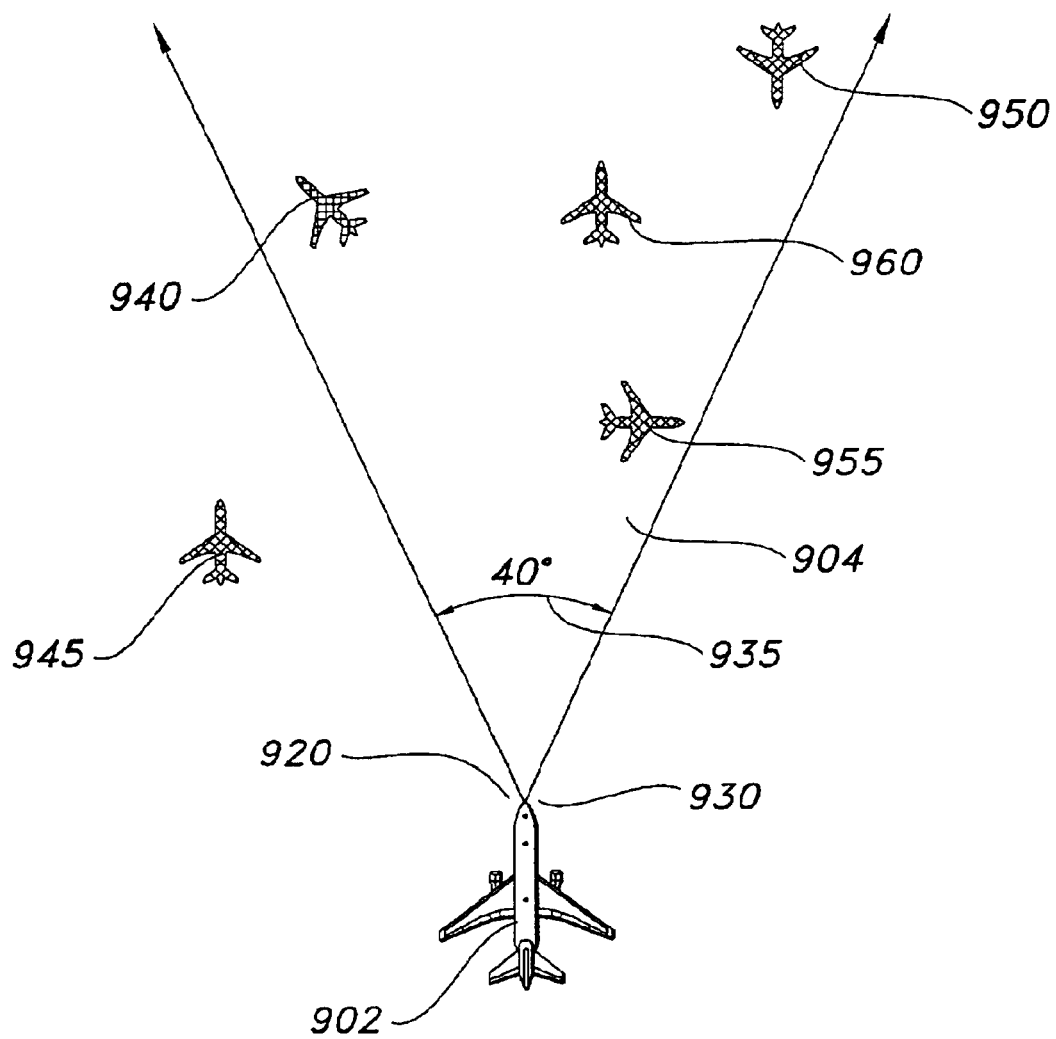

FIG. 9 is a graphical depiction that is useful in demonstrating the method used by the system to determine, based on the track and position of a currently-selected target aircraft, whether to display a closure indicator.

DETAILED DESCRIPTION OF THE PREFERRED EMBODIMENT

The present invention will now be described in greater detail with reference to the accompanying drawings, which depict various preferred embodiments of the invention. Many modifications and other embodiments of the invention will come to mind to an individual who is skilled in the pertinent art as that individual reviews the description below and the associated drawings. Therefore, it is to be understood that the invention is not to be limited to the specific embodiments disclosed, and that modifications and other embodiments are intended to be included within the scope of the invention. Although specific terms are employed in this description, they are used in a generic and descriptive sense only and not for purposes of limitation. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

I. System Architecture

FIG. 1 shows a block diagram of an exemplary embodiment of an aircraft surveillance system 50 according to a preferred embodiment of the invention. As will be understood by one skilled in the relevant technical field, the aircraft surveillance system 50 is preferably configured for use within the cockpit of the aircraft for which the surveillance system is being used (i.e. the "Own Ship" aircraft). However, in alternative embodiments of the invention, the aircraft surveillance system 50 may be configured to operate in a location that is remote from the Own Ship aircraft. For example, the aircraft surveillance system 50 may be positioned at a ground station, and may be configured to transmit information for display on a display screen within the cockpit of the Own Ship aircraft.

The aircraft surveillance system 50 includes a processor 60 that communicates with other elements within the aircraft surveillance system 50 via a system interface or bus 61. Also included in the aircraft surveillance system 50 is a display device/input device 64 for receiving and displaying data. This display device/input device 64 may be, for example, a keypad (such as the keypad 500 shown in FIG. 5) or pointing device that is used in combination with a display screen. The aircraft surveillance system 50 further includes memory 66, which preferably includes both read only memory (ROM) 65 and random access memory (RAM) 67. The server's ROM 65 is used to store a basic input/output system 26 (BIOS), containing the basic routines that help to transfer information between elements within the aircraft surveillance system 50.

In addition, the aircraft surveillance system 50 includes at least one storage device 63, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for the aircraft surveillance system 50. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, and a closure indicator display module 100. The closure indicator display module 100 controls certain aspects of the operation of the aircraft surveillance system 50, as is described in more detail below, with the assistance of the processor 60 and an operating system 80.

Also located within the aircraft surveillance system 50 is a system interface 74, for interfacing and communicating with other elements of the aircraft's navigational system. It will be appreciated by one of ordinary skill in the art that one or more of the aircraft surveillance system's components may be located geographically remotely from other aircraft surveillance system 50 components. Furthermore, one or more of the components may be combined, and additional components performing functions described herein may be included in the aircraft surveillance system 50.

II. System Overview

A system according to a preferred embodiment of the present invention includes a CDTI display for graphically displaying traffic information to a pilot within the cockpit of an aircraft. FIGS. 2, 3, and 4 are pictorial representations of such a CDTI display. As may be understood from these figures, a typical CDTI display 200, 300, 400 includes a graphical depiction of an Own Ship aircraft 202, 302, 402 and various aircraft (such as aircraft 205, 305, 405) that are flying in the general vicinity of the Own Ship aircraft 202, 302, 402. Such aircraft are generally referred to as "target" aircraft 205, 305, 405. The CDTI further includes a keypad, such as the keypad 500 shown in FIG. 5, for allowing a pilot of the Own Ship aircraft 202, 302, 402 to change various display parameters on the CDTI display. This keypad 500 preferably includes a TGT button 520 that is configured to allow a user to turn a "target selection mode" on or off. When the target selection mode is turned on, the user may use the T↑ button 521 and the T↓ button 522 to select a current target aircraft by toggling between the various target aircraft 205, 305, 405. The T↑ button 521 selects, as the next selected target aircraft, the next farthest target aircraft from the Own Ship aircraft 202, 302, 402. Similarly, the T↓ button 522, selects, as the next selected target aircraft, the next nearest target aircraft from the Own Ship aircraft 202, 302, 402.

As shown in FIG. 2, once the pilot designates a particular aircraft as the selected target aircraft, the system visually distinguishes the selected aircraft 205 from other target aircraft by displaying a thin line 207 around the outer perimeter of the symbol representing the selected target aircraft 205, and by changing the color of the symbol representing the selected target aircraft 205. The system also preferably displays additional information regarding the selected target aircraft 205. For example, as shown in FIG. 2, the system displays the ground speed 215 of the selected target aircraft in the lower left hand corner of the CDTI display screen 200.

The present invention provides an enhanced CDTI display that alerts pilots to changes in the relative positions, tracks, and movement of the Own Ship aircraft 202, 302, 402 and the selected target aircraft 205, 305, 405. In a preferred embodiment of the invention, when the relative positions, tracks, and rates of closure of the Own Ship aircraft 202, 302, 402 and the selected target aircraft 205, 305, 405 meet certain conditions, the system displays, in an easily-readable, graphical manner, an indication of closure 220, 320, 420 between the Own Ship aircraft 202, 302, 402 and the selected target aircraft 205, 305, 405. A graphic closure indicator according to a preferred embodiment of the invention is described in greater detail below.

III. Display of Closure Indicator

In a preferred embodiment of the invention, the system is configured to display a closure indicator 220, 320, 420 on the display screen 200, 300, 400 of an aircraft surveillance system (such as a CDTI) when certain conditions are satisfied. As may be understood from FIGS. 2 and 3, the system preferably displays the closure indicator 220, 320, 420 adjacent a symbol that represents the Own Ship aircraft 202, 302, 402.

In a preferred embodiment of the invention, the closure indicator 220, 320, 420 includes a closure rate indicator 224, 324, 424 that indicates the current rate at which the Own Ship aircraft 202, 302, 402 is closing in on, or receding from, the selected target aircraft 205, 305, 405. This closure rate indicator 224, 324, 424 preferably comprises an alphanumeric closure rate value 226, 326, 426 and a positive or negative symbol 228, 328, 428 to indicate whether the Own Ship aircraft 202, 302, 402 is closing in on, or receding from, the selected target aircraft 205, 305, 405. In this embodiment of the invention, the closure rate indicator 224, 324, 424 includes a positive sign immediately to the left of the alphanumeric closure rate value 226, 326, 426 if the Own Ship aircraft 202, 302 is closing in on the selected target aircraft 205, 305, 405. By the same token, the closure rate indicator 224 includes a negative sign immediately to the left of the alphanumeric closure rate value 226, 326, 426 if the Own Ship aircraft 202, 302, 402 is receding from the selected target aircraft 205, 305, 405. In a preferred embodiment of the invention, the closure rate indicator 224, 324, 424 displays the closure rate in knots.

In a preferred embodiment of the invention, the closure indicator 220, 320, 420 may also comprise a closing/receding indicia 222, 322 that further indicates whether the Own Ship aircraft 202, 302, 402 is closing in on, or receding from, the selected target aircraft 205, 305, 405. This closing/receding indicia 222, 322 is preferably a directional symbol that indicates by its orientation whether the Own Ship aircraft 202, 302, 402 is closing in on, or receding from, the selected target aircraft 205, 305, 405. In a preferred embodiment of the invention, the closing/receding indicia 222, 322 is displayed (as shown in FIG. 2) as an upwardly-directed arrow if the Own Ship aircraft 202, 302, 402 is closing in on the selected target aircraft 205, 305, 405. Similarly, in this embodiment of the invention, the closing/receding indicia 222, 322 is displayed as a downwardly-directed arrow (as shown in FIG. 3) if the Own Ship aircraft 202, 302, 402 is receding from the selected target aircraft 205, 305, 405.

The system is preferably configured so that the closure indicator 220, 320, 420 only includes a closing/receding indicia 222, 322 if the rate of closure between the Own Ship aircraft 202, 302, 402 and the selected target aircraft 205, 305, 405 is within a pre-determined range. In a preferred embodiment of the invention, the closure indicator 220, 320, 420 only includes a closing/receding indicia 222, 322 if the rate of closure between the Own Ship aircraft 202, 302, 402 and the selected target aircraft 205, 305, 405 is: (1) greater than a pre-determined upper threshold value; or (2) less than a pre-determined lower threshold value. Otherwise, as shown in FIG. 4, the system preferably displays a closure indicator 220, 320, 420 that does not include a closing/receding indicia 222, 322. In a preferred embodiment of the invention, the pre-determined upper threshold value is 5 knots, and the pre-determined lower threshold value is −5 knots.

It should be understood that the pre-determined range (or ranges) of closure rates for which the closure indicator 220, 330 will include a closing/receding indicia 222, 322 can be defined according to any desired set of display rules. For example, the system may be configured so that the closure indicator 220, 330 will only include a closing/receding indicia 222, 322 if the current rate of closure between the Own Ship aircraft 202, 302, 402 and the selected target aircraft 205, 305, 405 is greater than a pre-determined upper threshold value. Alternatively, the system may be configured so that the closure indicator 220, 330 will only include a closing/receding indicia 222, 322 if the current rate of closure between the Own Ship aircraft 202, 302, 402 and the selected target aircraft 205, 305, 405 is less than a pre-determined lower threshold value. In an alternative embodiment of the invention, the system may be configured so that the closure indicator 220, 330 always includes a closing/receding indicia 222, 322.

In a preferred embodiment of the invention, the system is configured to allow a pilot, or other user, to define (preferably while the aircraft is in flight) the predetermined range (or ranges) of closure rates for which the closure indicator 220, 330 will include a closing/receding indicia 222, 322. For example, the system may allow a pilot or other user to modify the pre-determined upper threshold value and/or the pre-determined lower threshold value as desired. This feature is advantageous because it allows a pilot to set the pre-determined range for closing/receding indicia display in response to current flying conditions.

To enhance the readability of the display screen 200, 300, 400, the system is preferably configured to position the closure indicator 220, 320, 420 on the display screen 200, 300, 400 in response to the closure rate between the Own Ship aircraft 202, 302, 402 and the selected target aircraft 205, 305, 405 satisfying certain criteria. For example, in a preferred embodiment of the invention, the system is configured to display the closure indicator 220, 320, 420 immediately adjacent the front end 203, 303 of the symbol representing the Own Ship aircraft 202, 302, 402 (as shown in FIG. 2) if the rate of closure between the Own Ship aircraft 202, 302, 402 and the selected target aircraft 205, 305, 405 is greater than the pre-determined upper threshold value. In this embodiment of the invention, the system is further configured to display the closure indicator 220, 320, 420 immediately adjacent the rear end 204, 304 of the Own Ship symbol 202, 302, 402 (as shown in FIG. 3) if the rate of closure between the Own Ship aircraft 202, 302, 402 and the selected target aircraft 205, 305, 405 is less than the pre-determined lower threshold value. The system is further preferably configured to display the closure indicator 220, 320 to one side of a symbol representing the Own Ship aircraft 202, 302, 402 (as shown in FIG. 4) if the closure rate is both: (1) equal to or above the predetermined lower threshold value; and (2) equal to or below the predetermined upper threshold value.

FIGS. 2, 3, and 4 provide two examples of closure indicators 220, 320, 420 according to a preferred embodiment of the invention. FIG. 2 depicts a situation in which an Own Ship aircraft 202 is closing in on the selected target aircraft 205, at a rate of 40 knots. As shown in this figure, because the Own Ship aircraft 202 is closing in on the selected target aircraft 205, the closure indicator 220 includes a plus sign 228 immediately to the left of the closure rate indicator 226. Furthermore, because the Own Ship aircraft 202 is closing in on the selected target aircraft 205 at a rate that is greater than a predetermined upper threshold value of 5 knots, the closure indicator 220 includes an upwardly-directed arrow 222 and the closure indicator 220 is positioned immediately adjacent a front end 203 of the symbol representing the Own Ship aircraft 202.

FIG. 3 depicts a situation in which an Own Ship aircraft 302 is receding from the selected target aircraft 305 at a rate of 60 knots. As shown in this figure, because the Own Ship aircraft 302 is receding from the selected target aircraft 305, the closure indicator 320 includes a minus sign 328 immediately to the left of the closure rate indicator 326. Furthermore, because the Own Ship aircraft 302 is receding from the selected target aircraft 305 at a rate that is less than a predetermined lower threshold value of −5 knots, the closure indicator 320 includes a downwardly-directed arrow 322 and the closure indicator 320 is positioned immediately adjacent a rear end 303 of the symbol representing the Own Ship aircraft 302.

FIG. 4 depicts a situation in which an Own Ship aircraft 402 is receding from the selected target aircraft 405 at a rate of 4 knots. As shown in this figure, because the Own Ship aircraft 402 is receding from the selected target aircraft 405, the closure indicator 420 includes a minus sign 428 immediately to the left of the closure rate indicator 426. Furthermore, because the closure rate between the Own Ship aircraft 402 and the selected target aircraft 405 is less than a predetermined upper threshold value of 5 knots, and greater than a predetermined lower threshold value of −5 knots, the closure indicator 420 includes no closing/receding indicia 222, 322 and the closure indicator 420 is positioned to one side of the symbol representing the Own Ship aircraft 402.

It should be understood that the preferred embodiment of the invention described above conveys, in three different ways, whether the Own Ship aircraft 202, 302, 402 is closing in on or receding from the selected target aircraft 205, 305, 405. More particularly, the system conveys this information via: (1) a plus or minus sign 228, 328, 428 displayed immediately to the left of the alphanumeric closure rate value 226, 326, 426; (2) the orientation of the closing/receding indicia 222, 322; and (3) the position of the closure indicator 220, 320 relative to the Own Ship symbol 202, 302, 402.

It should be understood that alternative embodiments of the invention may be configured to use any two of the above methods to indicate wither the Own Ship aircraft is closing in on, or receding from, the selected target aircraft. For example, the system may be configured to indicate whether the Own Ship is closing in on, or receding from the selected target aircraft by displaying a positive or negative sign 228, 328, 428 immediately to the left of the alphanumeric closure rate value 226, 326, 426, and by displaying a properly-oriented closing/receding indicia 222, 322, but not by varying the position of the closure indicator 220, 320 relative to the Own Ship symbol 202, 302, 402. Similarly, the system may be configured to display a positive or negative sign 228, 328, 428 immediately to the left of the alphanumeric closure rate value 226, 326, 426 and to vary the position of the closure indicator 220, 320 relative to the Own Ship symbol 202, 302, 402 according to whether the Own Ship aircraft is closing in on or receding from the selected target aircraft 205, 305, 405, but not to include a closing/receding indicia 222, 322 for indicating the relative movement of the Own Ship aircraft 202, 302, 402 and the selected target aircraft 205, 305, 405.

By the same token, the system may be configured to display only one of the three indicators of closing/receding discussed above. For example, in an alternative embodiment of the invention, the system may be configured to vary the position of the closure indicator 320 relative to the Own Ship symbol 202, 302, 402 according to whether the Own Ship aircraft 202, 302, 402 is closing in on or receding from the selected target aircraft 205, 305, 405, but not to include a positive or negative sign 228, 328, 428 or a closing/receding indicia 222, 322 to indicate the relative movement of the Own Ship aircraft 202, 302, 402 and the selected target aircraft 205, 305, 405.

IV. Conditions for Closure Indicator Display

As noted above, in a preferred embodiment of the invention, the system only displays the closure indicator 220, 320, 420 on the display screen 200, 300, 400 under certain pre-determined conditions. More specifically, the system preferably only displays the closure indicator 220, 320, 420 if: (1) the selected target aircraft 205, 305, 405 is within a pre-determined monitoring zone; and (2) the track of the selected target aircraft 205, 305, 405 is within a specified variance angle of the track of the Own Ship aircraft 202, 302, 402. In an alternative embodiment of the invention, the system will only display a closure indicator 223, 320, 420 if the above two requirements are satisfied and: (3) the closure rate between the Own Ship aircraft 202, 302, 402 and the selected target aircraft 205, 305, 405 is within a certain pre-determined range. These conditions are discussed in greater detail below.

A. Requirement 1—The Selected Target Aircraft is within a Pre-determined Monitoring Zone.

As noted above, the system preferably only displays a closure indicator 220, 320, 420 on the display screen 200, 300, 400 if the selected target aircraft 205, 305, 405 is within a predetermined monitoring zone 604, 904. In a preferred embodiment of the invention depicted in FIG. 6, this monitoring zone 604 is a three-dimensional, substantially cone-shaped segment of airspace having an axis 610 that is substantially co-linear with the track 615 of the Own Ship aircraft 602. The apex 630 of this cone is preferably immediately adjacent a front end 620 of the Own Ship aircraft 602 and extends outwardly from the front of the Own Ship aircraft 602. In a preferred embodiment of the invention, the cone-shaped segment of airspace is in the form of a right cone and the vertex angle 635 of the cone-shaped segment of airspace is about 40 degrees. (Note: For the sake of simplifying FIGS. 6, 7, and 9, these figures each depict examples in which there is no wind so that the track of the Own Ship aircraft 602, 702, 902 is the same as the heading of the Own Ship aircraft 602, 702, 902, and so that the track of each target aircraft is the same as its heading.) As will be understood by one skilled in the art, while the monitoring zone 604 is preferably a cone-shaped segment of airspace extending outwardly from the front portion 620 of the Own Ship aircraft 602, the monitoring zone 604 can be in any other shape or orientation. For example, the monitoring zone 604 could be in the form of an elongated cylinder that has a major axis that is substantially co-linear with the major axis 615 of the Own Ship aircraft 602. Alternatively, the monitoring zone 604 could be in the form of a cone that is not a right cone, or a right cone that has its apex adjacent the rear end 625 of the Own Ship aircraft 602 rather than the front end 620 of the Own Ship aircraft 602. In a preferred embodiment of the invention, to accommodate current flying conditions, the system is configured to allow a pilot or other user to select a current monitoring zone from several different monitoring zones having different shapes and orientations. In a further preferred embodiment of the invention, the system is configured to allow a user to modify at least one boundary of the current monitoring zone 604 as desired. For example, the system may allow a user to specify a different apex angle 635 for current a cone-shaped monitoring zone. This, in turn, would redefine the boundaries of the current monitoring zone 604.

B. Requirement 2—The Selected Target Aircraft's Track is within a Selected Variation Angle of the Own Ship Aircraft's Track As noted above, the system preferably only displays a closure indicator 220, 320, 420 on the CDTI display screen 200, 300, 400 if the selected target aircraft's track is within a selected variation angle of the Own Ship aircraft's track. To determine the variation angle between the selected target aircraft's track and the track of the Own Ship aircraft 202, 302, 402, the system first determines the two-dimensional horizontal track of the Own Ship aircraft 202, 302, 402. Next, the system determines the two-dimensional horizontal track of the selected target aircraft 205, 305, 405. The system then determines a "variation angle" between the track of the Own Ship aircraft 202, 302, 402 and the track of the selected target aircraft 205, 305, 405. This variation angle is simply the angular difference between the track of the selected target aircraft 205, 305, 405 and the track of the Own Ship aircraft 202, 302, 402. If this angle is greater than a pre-determined threshold variation angle, the system does not display a closure indicator 220, 320, 420 on the display screen 200, 300, 400.

FIG. 7 graphically illustrates an example in which there is no wind so that the track of the Own Ship aircraft 702 is the same as the heading of the Own Ship aircraft 702, and so that the track of each target aircraft is the same as its heading. In this example, the system only displays a closure indicator 220, 320, 420 on the CDTI display screen 200, 300, 400 if the selected target aircraft's track is within a variation angle of 20 degrees of the Own Ship aircraft's track. More particularly, this figure depicts an Own Ship aircraft 702, a first group of aircraft 705–730, 750–760 ("Group A") that have tracks that would not result in a closure indicator 220, 320, 420 being displayed on the Own Ship aircraft's display screen 200, 300, 400. This figure also includes a second group of aircraft 735–745 ("Group B") that have tracks that would result in a closure indicator 220, 320, 420 being displayed on the Own Ship aircraft's display screen 200, 300, 400.

Turning to Group A, target aircraft 705, 710, 715, 720, 725, 730, 750, 755, and 760 have tracks that are offset from the track of the Own Ship aircraft 702 in a clockwise direction by 25 degrees, 90 degrees, 155 degrees, 205 degrees, 270 degrees, 335 degrees, 165 degrees, 180 degrees, and 195 degrees, respectively. Accordingly, the variation angle between the track of the Own Ship aircraft 702 and the tracks of target aircraft 705 and 730 is 25 degrees. Similarly, the variation angle between the track of the Own Ship aircraft 702 and the tracks of target aircraft 715, 720 is 155 degrees. By the same token, the variation angle between the track of the Own Ship aircraft 702 and the tracks of target aircraft 710, 725 is 90 degrees. Also, the variation angle between the track of Own Ship aircraft 702 and the tracks of target aircraft 750 and 760 is 165 degrees. The variation angle between the track of the Own Ship aircraft 702 and the track of target aircraft 755 is 180 degrees. Because, in this example, the system will only display a closure indicator 220, 320, 420 if the variation angle between the Own Ship aircraft 702 and the selected target aircraft is 20 degrees or less, the system will not display a closure indicator 220, 320, 420 if any of the aircraft in Group A (i.e. aircraft 705, 710, 715, 720, 725, 730, 750, 755, 760) is designated as the selected target aircraft.

Focusing now on Group B, target aircraft 740, 745, 735 have tracks that are offset from the track of the Own Ship aircraft 702 in a clockwise direction by 0 degrees, 15 degrees, and 345 degrees, respectively. Accordingly, the variation angle between the track of the Own Ship aircraft 702 and the tracks of target aircraft 745 and 735 is 15 degrees. Similarly, the variation angle between the track of the Own Ship aircraft 702 and the track of target aircraft 740 is 0 degrees. Because, in this example, the system will display a closure indicator 220, 320, 420 if the selected target aircraft's track diverges from the track of the Own Ship aircraft by a threshold variation angle of 20 degrees or less, the system will display a closure indicator 220, 320, 420 if any of the aircraft in Group B is designated as the selected target aircraft.

While, in a preferred embodiment of the invention, the threshold variation angle is 20 degrees, the system may be configured to have a larger or smaller variation angle. In a preferred embodiment of the invention, the system is configured to allow a pilot or other user to modify the variation angle during flight to accommodate current flying conditions or user preferences.

C. Requirement 3—The Rate of Closure is within a Pre-Determined Range

As noted above, in an alternative embodiment of the invention, the system preferably only displays a closure indicator 220, 320, 420 on the CDTI display screen 200, 300, 400 if the rate of closure between the Own Ship aircraft 202, 302, 402 and the selected target aircraft 205, 305, 405 is within a pre-determined range. More specifically, in this embodiment of the invention, the system only displays a closure indicator 220, 320, 420 if the rate of closure between the Own Ship aircraft 202, 302, 402 and the selected target aircraft 205, 305, 405 is either: (1) greater than a pre-determined upper threshold value; or (2) less than a predetermined lower threshold value. Otherwise, the system does not display a closure indicator 220, 320, 420 on the Own Ship Aircraft's display screen. As noted above, in a preferred embodiment of the invention, the pre-determined upper threshold value is 5 knots, and the pre-determined lower threshold value is −5 knots.

It should be understood that the pre-determined range (or ranges) of closure rates for which the system will display a closure indicator 220, 320, 420 can be defined according to any desired set of display rules. For example, the system may be set to only display a closure indicator 220, 320, 420 if the current rate of closure between the Own Ship aircraft 202, 302, 402 and the selected target aircraft 205, 305, 405 is greater than a pre-determined upper threshold value. Alternatively, the system may be set to only display a closure indicator 220, 320, 420 if the current rate of closure between the Own Ship aircraft 202, 302, 402 and the selected target aircraft 205, 305, 405 is less than a predetermined lower threshold value. In a preferred embodiment of the invention, the system is configured to allow a pilot or other user define (preferably while the aircraft is in flight) the pre-determined range (or ranges) of closure rates for which the system will display a closure indicator 220, 320, 420. This feature is advantageous because it allows a pilot to set the pre-determined range for closure rate display in response to current flying conditions.

V. Alternative Embodiment Requiring Different Combinations of the above Requirements for Closure Indicator Display In a preferred embodiment of the invention, the system is configured to display a closure indicator 220, 320, 420 in response to Requirements 1 and 2, above, being satisfied. However, alternative embodiments of the invention may be configured to display a closure indicator 220, 320, 420 in response to any pre-determined combination of two or more of Requirements 1–3 being satisfied. For example, the system may be configured to display a closure indicator 220, 320, 420 only if: (1) the selected target aircraft 205, 305, 405 is within a pre-determined monitoring zone; (2) the selected target aircraft's track is within a selected variation angle of the Own Ship aircraft's track; and (3) the rate of closure between the Own Ship aircraft 202, 302, 402 and the selected target aircraft 205, 305, 405 is within a predetermined range. Alternatively, the system may be configured to display a closure indicator 220, 320, 420 only if the selected target aircraft 205, 305, 405 is within a pre-determined monitoring zone, and the rate of closure between the Own Ship aircraft 202, 302, 402 and the selected target aircraft 205, 305, 405 is within a pre-determined range. As a further alternative, the system may be configured to display a closure indicator 220, 320, 420 only if the selected target aircraft's track is within a selected variation angle of the Own Ship aircraft's track, and the rate of closure between the Own Ship aircraft 202, 302, 402 and the selected target aircraft 205, 305, 405 is within a pre-determined range.

Furthermore, the system may be configured to display a closure indicator 220, 320, 420 in response to only one of Requirements 1–3, above, being satisfied. For example, the system may be configured to display a closure indicator 220, 320, 420 in response to the selected target aircraft 205, 305, 405 being within a pre-determined monitoring zone. Similarly, the system may be configured to display a closure indicator 220, 320, 420 in response to a track of the selected target aircraft 205, 305, 405 being within a pre-determined variation angle of the track of the Own Ship aircraft 202, 302, 402. By the same token, the system may be configured to display a closure indicator 220, 320, 420 in response to the rate of closure between the Own Ship aircraft 202, 302, 402 and the selected target aircraft 205, 305, 405 being within a pre-determined range. In a further embodiment of the invention, the system is configured to constantly display a closure indicator 220, 320, 420 while the Own Ship aircraft 202, 302, 402 is in flight.

In a preferred embodiment of the invention, the system is configured to allow a pilot or other user to modify the conditions under which the system will display a closure indicator 220, 320, 420. The system preferably allows this to be done while the aircraft is in flight. For example, in a preferred embodiment of the invention, the system may allow a user to re-configure the system during flight from a first configuration to a second configuration. In the first configuration, the system may be configured, for example, to display a closure indicator 220, 320, 420 in response to the selected target aircraft's track being within a selected variation angle of the Own Ship aircraft's track. In the second configuration, the system may be configured to display a closure indicator 220, 320, 420 in response to: (1) the selected target aircraft's track being within a selected variation angle of the Own Ship aircraft's track; and (2) the rate of closure between the Own Ship aircraft 202, 302, 402 and the selected target aircraft 205, 305, 405 being within a pre-determined range. This functionality is advantageous because it allows pilots to configure the system as appropriate for current flying conditions.

VI. Automatic Removal of the Closure Indicator from the Display Screen

In a preferred embodiment of the invention, the system removes a closure indicator 220, 320, 420 from display on the Own Ship aircraft's display screen 200, 300, 400 in response to the Own Ship aircraft 202, 302, 402 landing. The system also preferably removes a closure indicator 220, 320, 420 from display on the Own Ship Aircraft's display screen 200, 300, 400 in response to the selected target aircraft 205, 305, 405 landing. This functionality is useful because an indication of closure is no longer necessary once either the Own Ship aircraft 202, 302, 402 or the selected target aircraft 205, 305, 405 has landed. In an alternative embodiment of the invention, the system removes a closure indicator 220, 320, 420 from display on the Own Ship Aircraft's display screen 200, 300, 400 in response to the selected target aircraft 205, 305, 405 landing, but does not move the closure indicator 220, 320, 420 from display in response to the Own Ship aircraft 202, 302, 402 landing. In a further alternative embodiment of the invention, the system removes a closure indicator 220, 320, 420 from display on the Own Ship aircraft's display screen 200, 300, 400 in response to the Own Ship aircraft 202, 302, 402 landing, but does not move the closure indicator 220, 320, 420 from display in response to the selected target aircraft 205, 305, 405 landing.

VII. General Operation of a Preferred Embodiment of the Invention

FIGS. 8A and 8B depict the general logic flow of a closure indicator display module 800 according to a preferred embodiment of the invention. When executing such a closure indicator display module 800, the system first executes Step 810 in which the system determines whether the selected target aircraft 205, 305, 405 is within a pre-determined monitoring zone 604 as discussed above. If so, the system proceeds to Step 820. If not, the system proceeds to Step 825, does not display a closure indicator 220, 320, 420 on the Own Ship aircraft's display screen 200, 300, 400, and returns to Step 810.

At Step 820, the system determines whether the selected target aircraft's track is within a pre-determined variation angle of the Own Ship aircraft's track. If so, the system proceeds to Step 830. If not, the system proceeds to Step 825, does not display a closure indicator 220, 320, 420 on the Own Ship aircraft's display screen 200, 300, 400, and returns to Step 810.

At Step 830, the system determines whether the closure rate between the selected target aircraft 205, 305, 405 and the Own Ship aircraft 202, 302, 402 is equal to or below a predetermined upper threshold value. If so, the system proceeds to Step 850. If not (i.e., the closure rate is above the pre-determined upper threshold value), the system executes Step 840, where it displays a closure indicator 220, 320, 420 that includes a closing/receding indicia 222, 322. The system displays this closure indicator 220, 320 on the Own Ship aircraft's display screen 200, 300, 400 immediately above a symbol representing the Own Ship aircraft 202, 302, 402. After executing Step 840, the system returns to Step 810.

At Step 850, the system determines whether the closure rate between the selected target aircraft 205, 305, 405 and the Own Ship aircraft 202, 302, 402 is equal to or above a predetermined lower threshold value. If so, the system proceeds to Step 870, where it displays a closure indicator 220, 320, 420 that does not include a closing/receding indicia. The system displays this closure indicator 220, 320 on the Own Ship aircraft's display screen 200, 300, 400 to one side of a symbol representing the Own Ship aircraft 202, 302, 402. After executing Step 870, the system returns to Step 810.

If the system determines, at Step 850, that the closure rate between the selected target aircraft 205, 305, 405 and the Own Ship aircraft 202, 302, 402 is not equal to or above a predetermined lower threshold value (i.e., the closure rate is below the pre-determined lower threshold value), the system executes Step 860 where it displays a closure indicator 220, 320, 420 that includes a closing/receding indicia 222, 322. The system displays this closure indicator 220, 320 on the Own Ship aircraft's display screen 200, 300, 400 immediately below a symbol representing the Own Ship aircraft 202, 302, 402. After executing Step 840, the system returns to Step 810.

In this embodiment of the invention, the system also removes the closure indicator 220, 320, 420 from display on the Own Ship aircraft's display screen 200, 300, 400 when either the Own Ship aircraft 202, 302, 402 or the selected target aircraft 205, 305, 405 lands.

FIG. 9, which graphically depicts an Own Ship aircraft 902 flying in relation to several target aircraft 940–960, may be used to further understand the general functionality of a system according to a preferred embodiment of the invention. In this preferred embodiment of the invention, the system is configured to only display a closure indicator 220, 320, 420 if the selected target aircraft is within a pre-determined monitoring zone 904 that is defined by a cone-shaped segment of airspace having an apex angle 935 of 40 degrees, that has an apex 930 that is positioned immediately adjacent the front end 920 of the Own Ship aircraft 902, and that extends outwardly from the front portion 920 of the Own Ship aircraft 902 so that the axis 910 of the cone-shaped segment of airspace is substantially co-linear with the major axis of the Own Ship aircraft 902.

Furthermore, the system is configured to only display a closure indicator 220, 320, 420 on the Own Ship aircraft's display screen if the track of the selected target aircraft is within a 20 degree variation angle from the Own Ship aircraft's track. As mentioned above, this figure depicts an example in which there is no wind so that the track of the Own Ship aircraft 902 is the same as the heading of the Own Ship aircraft 902, and so that the track of each target aircraft is the same as its heading.

In the example shown in FIG. 9, the system clearly would not display a closure indicator 220, 320, 420 if aircraft 945 were the selected target aircraft because aircraft 945 is well outside of the pre-determined monitoring zone 904. Similarly, even though aircraft 940, 950, and 955 may be within the pre-determined monitoring zone 904, the system would not display a closure indicator 220, 320, 420 if any of these aircraft were designated as the selected target aircraft because the variation angle between the track of each of these aircraft and the Own Ship aircraft 902 is greater than the threshold 20 degree variation angle. More particularly, the variation angle between track of the Own Ship aircraft 902 and the track of target aircraft 955 is about 90 degrees. Similarly, the variation angle between the Own Ship aircraft between the track of the Own Ship aircraft 902 and the track of the target aircraft 950 is about 180 degrees. By the same token, the variation angle between the track of the Own Ship aircraft 902 and the track of target aircraft 940 is about 45 degrees.

As may be understood from FIG. 9, the variation angle between the Own Ship aircraft 902 and target aircraft 960 is about 0 degrees. Thus, presuming that aircraft 960 is not outside of the pre-determined monitoring zone 904 by virtue of its altitude, the system would display a closure indicator 220, 320, 420 on the Own Ship aircraft's display screen 200, 300, 400 if this aircraft were the selected target aircraft.

VIII. Conclusion

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What we claim is:

1. A system for displaying aeronautical information, said system comprising:

a central processing unit;

a memory coupled to said processing unit; and a display screen coupled to said central processing unit, said central processing unit being configured for executing the steps of:

determining whether a target aircraft is within a pre-determined monitoring zone;

responsive, at least in part, to said target aircraft being within said predetermined monitoring zone, displaying a closure indicator on said display screen;

allowing a user to at least partially modify at least one boundary of said monitoring zone; and comparing a track of said target aircraft with a track of an Own Ship aircraft; and responsive, at least in part, to said track of said target of said Own Ship aircraft, performing said step of displaying said closure indicator on said display screen.

2. The system of claim 1, wherein said central processing unit is configured for executing the step of:

responsive, at least in part, to said target aircraft being outside of said predetermined monitoring zone, displaying no closure indicator on said display screen.

3. The system of claim 1, wherein said predetermined monitoring zone is adjacent a front portion of an Own Ship aircraft.

4. The system of claim 3, wherein said monitoring zone is a substantially cone-shaped segment of airspace.

5. The system of claim 4, wherein an apex of said cone-shaped segment of airspace is positioned adjacent a front end of said Own Ship aircraft, and wherein an axis of said cone-shaped segment of airspace is substantially colinear with a track of said Own Ship aircraft.

6. The system of claim 4, wherein a vertex angle of said cone-shaped segment of airspace is about 40 degrees.

7. The system of claim 1, wherein said central processing unit is configured for executing the step of:

in response to said track of said target aircraft being outside of said predetermined variation angle of said track of said Own Ship, displaying no closure indicator on said display screen.

8. The system of claim 1, wherein said central processing unit is configured for allowing a user to modify said predetermined variation angle.

9. The system of claim 1, wherein said predetermined variation angle is about 20 degrees.

10. The system of claim 1, wherein said closure indicator comprises a closing/receding indicia that indicates whether said Own Ship aircraft is closing in on, or receding from, said target aircraft.

11. The system of claim 10, wherein said closure indicator comprises a closure rate indicator.

12. The system of claim 11, wherein said closure rate indicator comprises an alphanumeric value indicating the current rate at which said Own Ship aircraft is closing in on, or receding from, said target aircraft.

13. The system of claim 1, wherein said central processing unit is configured for displaying said closure indicator to one side of a symbol representing said Own Ship aircraft in response to a closure rate between said target aircraft and said Own Ship aircraft being outside of a predetermined range.

14. The system of claim 1, wherein, if a closure rate between said target aircraft and said Own Ship aircraft is within a predetermined range, said closure indicator comprises a closing/receding indicia that indicates whether said Own Ship aircraft is closing in on, or receding from, said target aircraft.

15. The system of claim 14, wherein, if a closure rate between said target aircraft and said Own Ship aircraft is outside of said predetermined range, said closure indicator does not comprise a closing/receding indicia that indicates whether said Own Ship aircraft is closing in on, or receding from, said target aircraft.

16. The system of claim 14, wherein if a closure rate between said target aircraft and said Own Ship aircraft is above a predetermined upper threshold value, said closure indicator comprises a closing/receding indicia that indicates that said Own Ship aircraft is closing in on said target aircraft.

17. The system of claim 16, wherein said predetermined upper threshold value is about 5 knots.

18. The system of claim 14, wherein, if a closure rate between said target aircraft and said Own Ship aircraft is below a predetermined lower threshold value, said closure indicator comprises a closing/receding indicia that indicates that said Own Ship aircraft is receding from said target aircraft.

19. The system of claim 18, wherein said predetermined lower threshold value is about −5 knots.

20. The system of claim 14, wherein said closing/receding indicia comprises an upwardly-directed arrow if said Own Ship aircraft is closing in on said target aircraft.

21. The system of claim 14, wherein said closing/receding indicia is displayed above a symbol representing said Own Ship aircraft if said Own Ship aircraft is closing in on said target aircraft.

22. The system of claim 14, wherein said closing/receding indicia comprises a downwardly-directed arrow if said Own Ship aircraft is receding from said target aircraft.

23. The system of claim 14, wherein said closing/receding indicia is displayed below a symbol representing said Own Ship aircraft if said Own Ship aircraft is receding from said target aircraft.

24. The system of claim 1, wherein said central processing unit is configured for executing the steps of:

determining whether a closure rate between said target aircraft and said Own Ship aircraft is above a predetermined upper threshold value; and responsive, at least in part, to said closure rate being above said predetermined upper threshold value, displaying said closure indicator in a predetermined position on said display screen.

25. The system of claim 24, wherein said predetermined position is immediately above an Own Ship icon displayed on said display screen.

26. The system of claim 1, wherein said central processing unit is configured for executing the steps of:

determining whether a closure rate between said target aircraft and said Own Ship aircraft is above a predetermined upper threshold value; and responsive, at least in part, to said closure rate being above said predetermined upper threshold value, displaying a closing/receding indicia on said display screen.

27. The system of claim 26, wherein said predetermined upper threshold value is about 5 knots.

28. The system of claim 1, wherein said central processing unit is configured for executing the steps of:

determining whether a closure rate between said target aircraft and said Own Ship aircraft is below a predetermined lower threshold value; and responsive, at least in part, to said closure rate being below said predetermined lower threshold value, displaying said closure indicator in a predetermined position on said display screen.

29. The system of claim 28, wherein said predetermined position is immediately below an Own Ship icon displayed on said display screen.

30. The system of claim 1, wherein said central processing unit is configured for executing the steps of:

determining whether a closure rate between said target aircraft and said Own Ship aircraft is below a predetermined lower threshold value; and responsive, at least in part, to said closure rate being below said predetermined lower threshold value, displaying a closing/receding indicia on said display screen.

31. The system of claim 30, wherein said lower threshold value is about −5 knots.

32. A system for displaying aeronautical information, said system comprising:
a central processing unit;
a memory coupled to said processing unit; and
a display screen coupled to said central processing unit, said central processing unit being configured for executing the steps of:
determining whether a target aircraft is within a pre-determined monitoring zone;
responsive, at least in part, to said target aircraft being within said predetermined monitoring zone, displaying a closure indicator on said display screen;
allowing a user to at least partially modify at least one boundary of said monitoring zone; and
executing the step of:
in response to (1) a closure rate between said target aircraft and said Own Ship aircraft being above a predetermined lower threshold value; and (2) said closure rate being below a predetermined upper threshold value, executing a step of displaying no closure indicator on said display screen.

33. The system of claim 1 wherein said central processing unit is configured for executing the step of:
in response to (1) a closure rate between said target aircraft and said Own Ship aircraft being above a predetermined lower threshold value; and (2) said closure rate being below a predetermined upper threshold value, executing a step of displaying no closing/receding indicia on said display screen.

34. The system of claim 33, wherein said central processing unit is configured for allowing a user to modify said predetermined upper threshold value.

35. The system of claim 33, wherein said central processing unit is configured for allowing a user to modify said predetermined lower threshold value.

36. A system for displaying aeronautical information, said system comprising:
a central processing unit;
a memory coupled to said processing unit, and
a display screen coupled to said central processing unit, said central processing unit being configured for executing the steps of:
determining whether a target aircraft is within a pre-determined monitoring zone;
responsive, at least in part, to said target aircraft being within said predetermined monitoring zone, displaying a closure indicator on said display screen;
allowing a user to at least partially modify at least one boundary of said monitoring zone; and
removing said closure indicator from said display screen in response to said Own Ship aircraft landing.

37. A system for displaying aeronautical information, said system comprising:
a central processing unit;
a memory coupled to said processing unit; and
a display screen coupled to said central processing unit, said central processing unit being configured for executing the steps of:
determining whether a target aircraft is within a pre-determined monitoring zone;
responsive, at least in part, to said target aircraft being within said predetermined monitoring zone, displaying a closure indicator on said display screen;
allowing a user to at least partially modify at least one boundary of said monitoring zone; and
removing said closure indicator from said display screen in response to said target aircraft landing.

38. A computer-readable medium comprising computer-executable instructions for performing the steps of
comparing a track of a target aircraft with a track of an Own Ship aircraft; and
responsive, at least in part, to said track of said target aircraft being within a pre-determined variation angle of said track of said Own Ship aircraft, displaying a closure indicator on said display screen,
said computer-readable medium further comprises computer-executable instructions for:
in response to (1) a closure rate between said target aircraft and said Own Ship aircraft being above a predetermined lower threshold value; and (2) said closure rate being below a predetermined upper threshold value, executing a step of displaying no closing/receding indicia on said display screen.

39. The computer-readable medium of claim 38, wherein said computer-readable medium further comprises computer-executable instructions for:
determining whether said target aircraft is within a pre-determined monitoring zone; and
responsive, at least in part, to said target aircraft being within said predetermined monitoring zone, performing said step of displaying a closure
indicator on said display screen.

40. A method of displaying aeronautical information, said method comprising the steps of:
determining whether a closure rate between a target aircraft and an Own Ship aircraft is above a predetermined upper threshold value; and
responsive, at least in part, to said closure rate being above said predetermined upper threshold value, performing a step of displaying a closure indicator on a display screen, said closure indicator comprising a closing/receding indicia.

41. The method of claim 40, said method further comprising the steps of:
determining whether said closure rate is below a predetermined lower threshold value; and
responsive, at least in part, to said closure rate being below said predetermined lower threshold value, performing a step of displaying a closure indicator on a display screen, said closure indicator comprising a closing/receding indicia.

42. The method of claim 41, said method further comprising the steps of
in response to (1) a closure rate between said target aircraft and said Own Ship aircraft being above a predetermined lower threshold value; and (2) said closure rate being below said predetermined upper threshold value, executing a step of displaying a closure indicator on a display screen, said closure indicator comprising no closing/receding indicia.

43. The method of claim 41, said method further comprising the steps of:
determining whether said target aircraft is within a pre-determined monitoring zone; and
responsive, at least in part, to said target aircraft being within said predetermined monitoring zone, displaying a closure indicator on said display screen.

44. The method of claim 43, said method further comprising the steps of:

comparing a track of said target aircraft with a track of said Own Ship aircraft; and responsive, at least in part, to said track of said target aircraft being within a pre-determined variation angle of said track of said Own Ship aircraft, displaying a closure indicator on said display screen.

45. The method of claim 41, said method further comprising the steps of:

comparing a track of said target aircraft with a track of said Own Ship aircraft; and responsive, at least in part, to said track of said target aircraft being within a pre-determined variation angle of said track of said Own Ship aircraft, displaying a closure indicator on said display screen.

46. A system for displaying aeronautical information, said system being configured for use within an Own Ship aircraft, and said system comprising:

a central processing unit;

a memory coupled to said processing unit; and a display screen coupled to said central processing unit, said central processing unit being configured for executing the steps of:

determining a closure rate between a target aircraft and said Own Ship aircraft;

displaying a symbol representing said Own Ship aircraft on said display screen; and displaying a closure indicator on said display screen adjacent to said symbol representing said Own Ship aircraft, said closure indicator being operative to visually relate said closure rate to a user.

47. The system of claim 46, wherein said closure indicator comprises a closing/receding indicia that indicates whether said Own Ship is closing in on, or receding from, said target aircraft.

48. The system of claim 47, wherein said closing/receding indicia comprises an upwardly-directed arrow if said Own Ship aircraft is closing in on said target aircraft, and a downwardly-directed arrow if said Own Ship aircraft is receding from said target aircraft.

49. The system of claim 47, wherein said closure indicator comprises a closure rate indicator that includes an alphanumeric value indicating the current rate at which said Own Ship aircraft is closing in on, or receding from, said target aircraft.

* * * * *